Dec. 30, 1952     U. B. STEVENSON     2,623,483
SEED AND FERTILIZER DISTRIBUTING RUNNER
Filed Jan. 20, 1948     2 SHEETS—SHEET 1
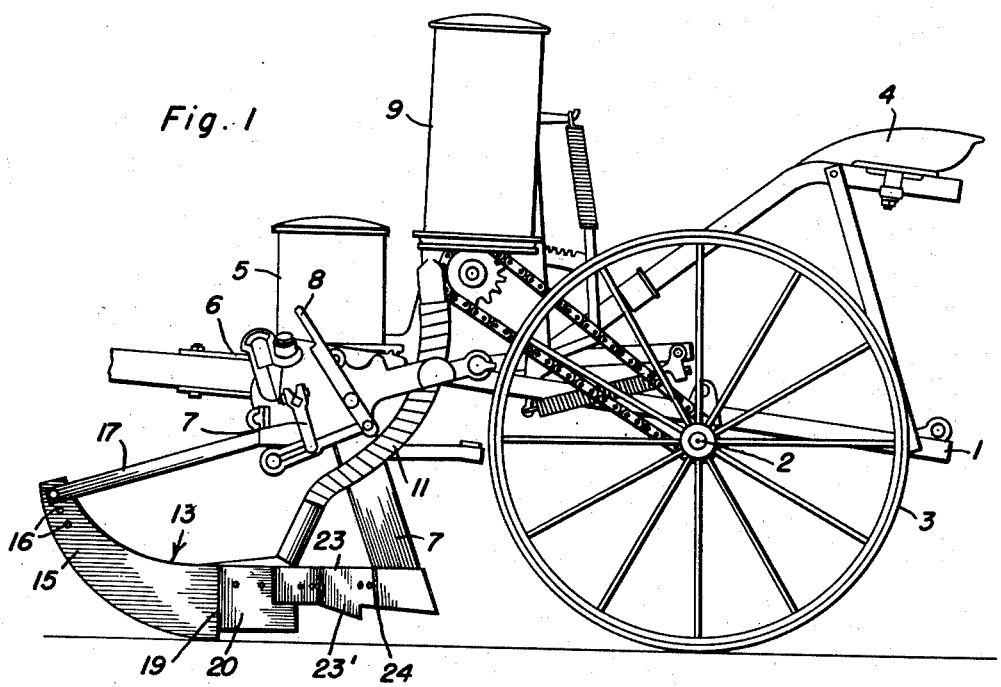
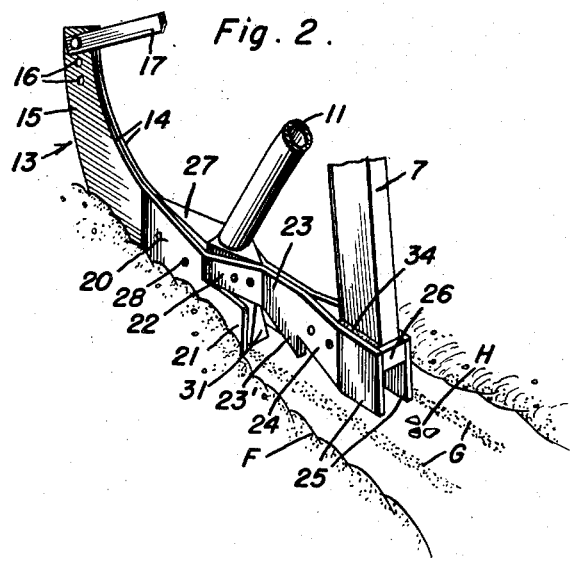
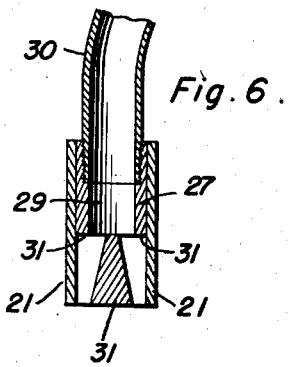
Inventor
Ulpian B. Stevenson
By Clarence A. O'Brien
and Harvey B. Jackson
Attorneys Dec. 30, 1952  U. B. STEVENSON  2,623,483
SEED AND FERTILIZER DISTRIBUTING RUNNER
Filed Jan. 20, 1948  2 SHEETS—SHEET 2

Inventor
Ulpian B. Stevenson

By
Attorneys

Patented Dec. 30, 1952

2,623,483

UNITED STATES PATENT OFFICE 2,623,483

SEED AND FERTILIZER DISTRIBUTING RUNNER

Ulpian B. Stevenson, Paragould, Ark.

Application January 20, 1948, Serial No. 3,308

1 Claim. (Cl. 111—73)

My invention relates to improvements in seed and fertilizer distributing runners for check row corn planters equipped with both seed and fertilizer supply hoppers.

The primary object of my invention is to provide a simple form of efficient furrow opening runner for such planters adapted for depositing fertilizer in the furrow deeper than the seed and upon opposite sides of the line of planting of the seed, but, close to the seed to thereby provide for proper fertilization without detrimental contact of the fertilizer with the seed.

Another object is to provide a device of the character and for the purpose above set forth which is adapted for use on present day check row corn planters, without material change in the corn planter structure.

Other and subordinate objects, within the purview of my invention, together with the precise nature of my improvements, will be readily understood when the succeeding description and claim are read with reference to the drawings accompanying and forming part of this specification.

In said drawings:

Figure 1 is a view in side elevation illustrating my improved seed and fertilizer distributing runner applied to a check row corn planter;

Figure 2 is a fragmentary view in perspective drawn to a larger scale and illustrating the manner in which the runner distributes the seed and fertilizer in the furrow;

Figure 6 is a fragmentary view in vertical section taken on the line 6—6 of Figure 5.

Figure 3:
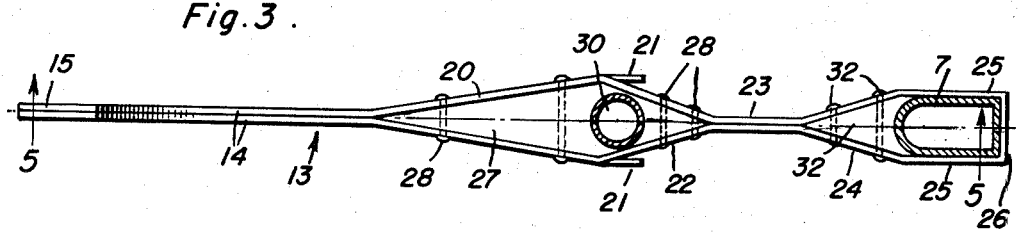
Figure 3 is a view in plan, partly in section, of the runner drawn to a still larger scale.
Figure 4:
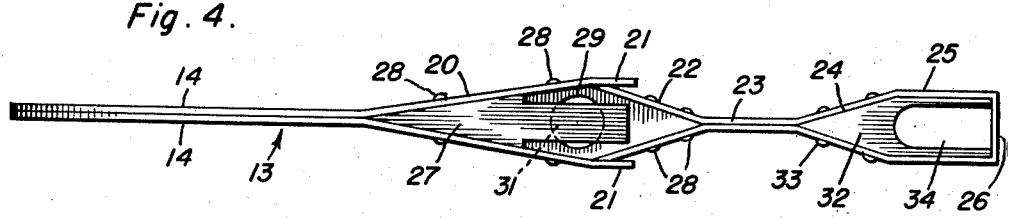
Figure 4 is a view in bottom plan of the same.
Figure 5:
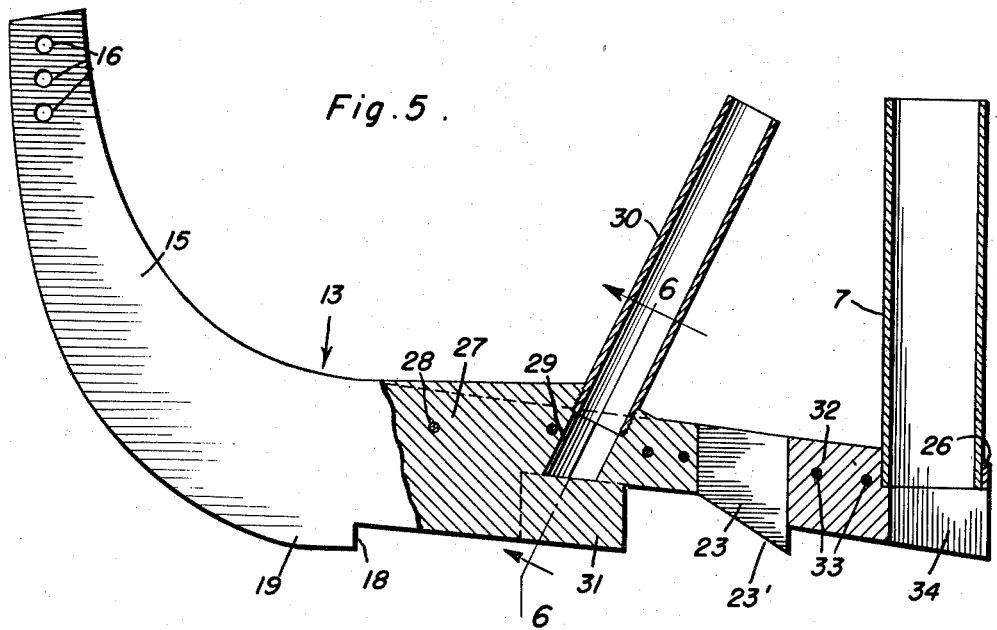
Figure 5 is a view partly in side elevation and partly in longitudinal section taken on the line 5—5 of Figure 3.

Referring to the drawings by numerals, my improved seed and fertilizer distributing runner has been shown therein, for the purpose of illustration, as applied to a well known type of two-row, check row, corn planter in which I designates the back frame supported intermediate its ends by an axle 2 and ground wheels as at 3, and carrying the driver seat 4. The numeral 5 designates one of the usual pair of side seed supply hoppers supported by a forward frame, indicated generally at 6, pivoted in a manner not shown, on the back frame I, for the usual purpose, and carrying seed delivery mechanism indicated generally by the numeral 7 and for delivering seed from the hopper 5 into the usual seed dropping boot 7 under control of the usual check row wire lever 8. The numeral 9 designates one of the usual pair of side fertilizer supply hoppers associated with each seed supply hopper 5 and carried by the back frame I for supplying fertilizer to a flexible boot 11 under operation of fertilizer ejecting mechanism, not shown, operated by a sprocket and chain drive 12 from the axle 2.

Such corn planters being well known and understood in the art, it has not been deemed necessary to a proper understanding of my invention to enter into further details of the planter.

According to my invention, a runner 13 is provided comprising a pair of side by side elongated blades 14 and having an upwardly curved front end section 15 formed with vertically spaced openings 16 for attachment to the front end of the usual brace 17 suitably connected, as at 18, to the front frame 6. The runner 13, rearwardly of the front end section 15 is under-cut to form a vertical straight edge 18, whereby said section 15 is provided with a lower edge pilot portion 19 for traveling in the furrow F.

Immediately in the rear of the section 15, the blades 14 diverge rearwardly and are separated to form a wedge-shaped furrow opening section 20 terminating in a pair of laterally spaced, parallel, bottom wings 21 and above which said blades 14 converge rearwardly to form a rearwardly tapered section 22 in the rear of which said blades 14 are engaged to form a double thickness section 23 of the blades with a downwardly and rearwardly slanting covering tooth 23' for a purpose presently seen.

In the rear of the tooth 23', the blades 14 again diverge to form another wedge-shaped furrow opening section 24 terminating in laterally spaced, flat, parallel sides 25 connected by an upper rear end cross strap 26. The bottom of the furrow opening section 24 is above the bottom of the furrow opening section 20 for a purpose presently seen.

A block 27, generally diamond-shaped, is fitted in the furrow opening sections 20, 22 and secured therein by bolts 28 and has formed therein, substantially at the juncture of said sections 20, 22, a downwardly and forwardly inclined fertilizer dropping bore 29 in which is threaded an upstanding pipe section 30 to the upper end of which the fertilizer dropping boot 11 is suitably connected. The bore 29 opens at its bottom intermediate the wings 21. A ground engaging bottom divider tongue 31 on the block 27 extends longitudinally along the same in the median plan of said block beneath the bore 29 and splits the bottom of said bore diametrically thereof and extends slightly forwardly and rearwardly thereof and midway between the wings 21 with downwardly flaring sides. The tongue 31 divides the furrow opening section 20 longitudinally from the bore 29 to the bottom of said section.

A block 32 is fitted in the section 24 and secured therein by rivet head bolts 33 and into the rear portion of which the seed dropping boot 7 extends downwardly partway therein and is fastened in vertical alignment with a longitudinal, vertical seed dropping slot 34 in the block which has the strap 26 extending across the rear open end of the slot.

As will now be seen, and as illustrated in Figure 2, the furrow opening section 20 and wings 21 open the furrow F in advance and opposite the fertilizer dropping bore 29, and the fertilizer G drops onto the divider tongue 31 and is divided thereby until it reaches the ground to be deposited in the furrow F upon opposite sides of said tongue 31 and distributed in the furrow F in two rows upon opposite sides of the line of travel of the runner 13 and planting of the seed H. The covering tooth 23 follows the tongue 31 and by digging into the bottom of the furrow F tends to cover the fertilizer rows G. The furrow opening section 24 acts to maintain the furrow F open in advance of the seed dropping boot 7 and to cause the seed 8 to be dropped in between the rows of fertilizer G, as will be clear. By having the bottom of the furrow opening section 24 above the bottom of the furrow opening section 20, the fertilizer is deposited deeper than the seed. By means of the holes 16 the runner 13 may be selectively fastened to the brace 17 to tilt said runner in the usual manner as desired.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

Having described the invention, what is claimed as new is:

A seed and fertilizer distributing runner, comprising a pair of elongated vertically disposed plates, the forward portions of said plates being in side by side engaging relation, said plates then diverging rearwardly to form diverging parts, a short vertical wing extending rearwardly from the lower portion of each diverging part, said wings being generally parallel, said wings forming with said diverging parts and forward portions a furrow opener, a pair of converging parts extending rearwardly from said diverging parts above said wings, said plates then extending rearwardly in side by side engaging relation and of a vertical dimension extending below said converging parts to form a depending covering tooth, said plates then diverging rearwardly and terminating in a pair of vertical generally parallel wings to form a second furrow opener, a block fitted and fixed in the space between said diverging and converging parts and having an opening therein for dropping fertilizer therethrough, said block embodying a tongue coplanar with said covering tooth beneath said opening to cause fertilizer dropped therethrough to be distributed in separated rows on opposite sides of said tongue for covering by said tooth, said furrow openers and tongue and covering tooth being coplanar, and a block fitted in the terminal portions of said plates and having an opening therein for depositing seed between covered rows of fertilizer.

ULPIAN B. STEVENSON.

REFERENCES CITED

The following references are of record in the file of this patent:

UNITED STATES PATENTS

| Number | Name | Date |
| --- | --- | --- |
| 292,460 | Albach | Jan. 29, 1884 |
| 362,943 | Daniels | May 17, 1887 |
| 408,378 | Cummings et al. | Aug. 6, 1889 |
| 601,870 | Davison | Apr. 5, 1898 |
| 1,229,604 | Garst | June 12, 1917 |
| 1,234,525 | Aspinwall | July 24, 1917 |
| 1,905,767 | Traphagen | Apr. 25, 1933 |
| 1,906,351 | White | May 2, 1933 |
| 2,048,441 | Feltman | July 21, 1936 |
| 2,159,652 | Brunner | May 23, 1939 |
| 2,164,066 | Holle | June 27, 1939 |